United States Patent [19]
Gaheen

[11] 3,781,887
[45] Dec. 25, 1973

[54] SATELLITE INSPECTION RADAR
[75] Inventor: Alfred F. Gaheen, Glen Burnie, Md.
[73] Assignee: The United States of America as represented by the Secretary of the Air Force, Washington, D.C.
[22] Filed: June 14, 1967
[21] Appl. No.: 646,797

[52] U.S. Cl. ....... 343/13 R, 343/100 ST, 343/12 R, 343/13 R, 343/7 PF, 343/112 CA, 244/1 SA
[51] Int. Cl. ............................................. G01s 9/06
[58] Field of Search .................. 343/12, 13, 100 ST, 343/12 R, 13 R, 112 CA, 7 PF; 244/1 SA, 1 SD

[56] References Cited
UNITED STATES PATENTS
3,527,167 9/1970 Morse ............................... 343/7 PF
3,112,480 11/1963 Lakatos ....................... 343/112 CA

*Primary Examiner*—Samuel Feinberg
*Assistant Examiner*—S. C. Buczinski
*Attorney*—Harry A. Herbert, Jr. and George Fine

[57] ABSTRACT

A radar system allowing an inspecting satellite to approach another satellite within a number of feet without contact therebetween. The radar system utilizes a pair of wide-beam antennas located along the roll and pitch axes of the inspecting satellite. A short pulse radar associated therewith is used to obtain range to the closest point and a comparison is made between the range measurements of each antenna in a pair. Thus a type of "sampled comparison" system is provided at a PRF/4 rate.

3 Claims, 3 Drawing Figures

SATELLITE INSPECTION RADAR

The present invention relates to a radar system associated with a reconnaissance satellite to permit the reconnaissance satellite to approach a target satellite without contact therebetween, and more particularly, a reconnaissance satellite equipped with a radar system employing a pair of wide-beam antennas located along the roll and pitch axes for comparison of range measurements derived therethrough.

The present invention provides a radar system which will allow closure of one satellite to within a number of feet of another and allow the first satellite to control its attitude with respect to the second such that no contact takes place between the two. The system would also be of value to a non-cooperative rendezvous scheme where it is desired to utilize a number of other short-range inspecting sensors on the target satellite.

The basic operating technique is to utilize a pair of wide-beam antennas (for example, isotropic) located along the roll and pitch axes of the inspecting vehicle. A short pulse radar is used to obtain the range to the closest point and a comparison is made between the range measurements of each antenna in a pair. Thus a type of "sampled range comparison" system is developed which is similar to amplitude or phase comparison monopulse, but is sampled at a PRF/4 rate.

The object of the present invention is to provide a radar system for a reconnaissance satellite wherein the radar system employs a pair of wide-beam antennas located along the roll and pitch axes of the satellite for comparison of range measurements derived therethrough.

Another object of the present invention is to provide a radar system for a reconnaissance satellite wherein a pair of antennas associated with the radar is located along the roll and pitch axes of the satellite and a comparison is made between the range measurements of each antenna in a pair.

Yet another object of the present invention is to provide a radar system for an inspecting satellite wherein the output of the radar system will be range to the nearest point on a target satellite and a measurement between the roll and pitch axes of the inspector satellite and the closest point in the target.

The various features of novelty which characterize the invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
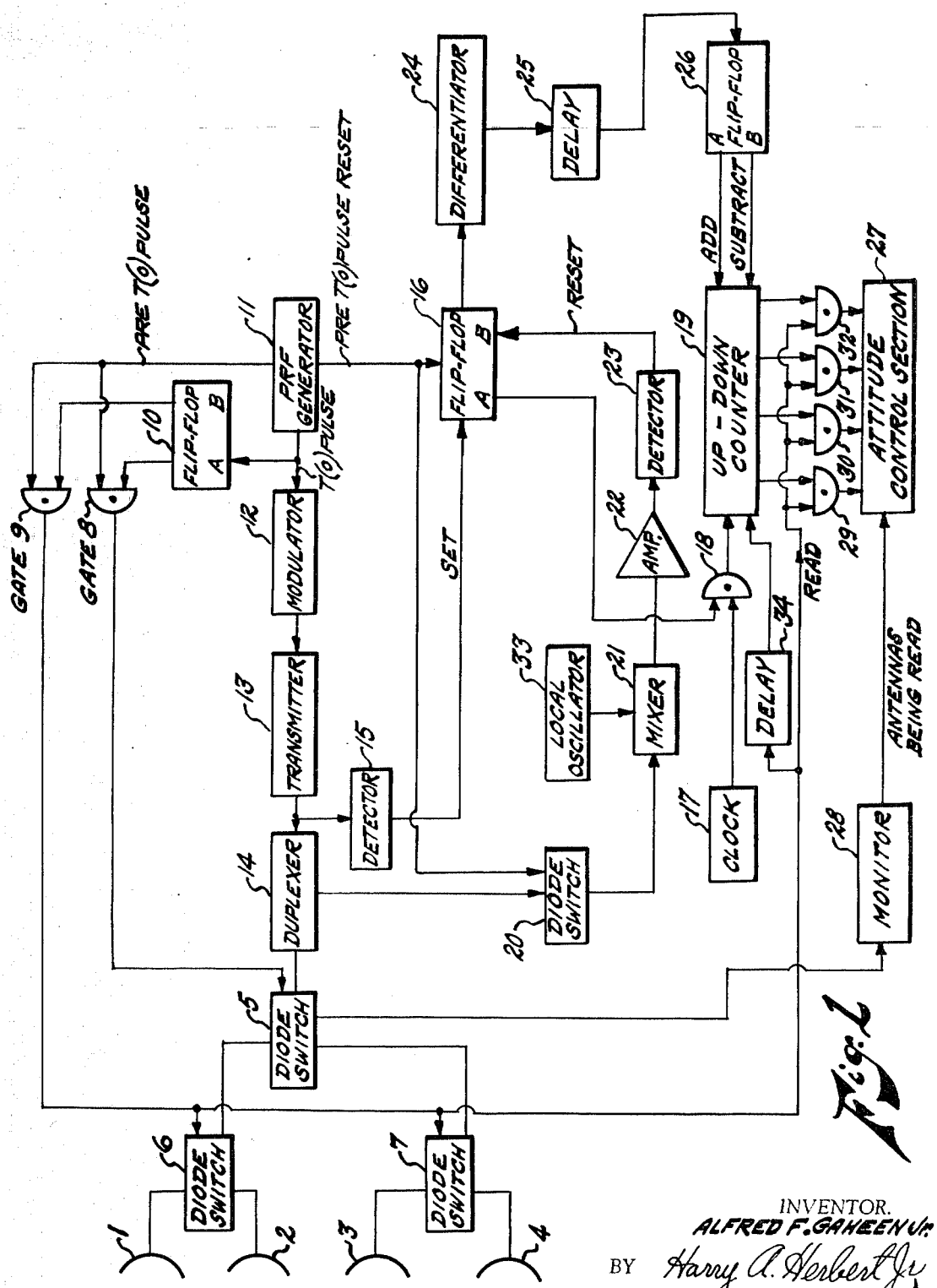
FIG. 1 shows a preferred embodiment of the present invention in the form of a radar system for an inspecting (reconnaissance) satellite.

Now referring in detail to FIG. 1, there are shown two pair of wide-beam antennas. The wide-beam antennas may be, for example, isotropic. The first pair consists of antennas 1 and 2, and the second pair of antennas 3 and 4. Antennas 1, 2, 3, and 4 are located along the roll and pitch axis of inspecting satellite 50 shown in FIG. 2. A short pulse radar associated with aforesaid antennas is utilized to obtain range to the closest point of the satellite being inspected. Comparison is then made between the range measurements of each antenna in a pair. Thus a type of "sampled range comparison" system is provided which is similar to amplitude or phase comparison monopulse, but is sampled at a PRF/4 rate. The following description of the system's operation will better bring out some of the salient operating characteristics.

The transmitter section which is comprised of modulator 12 and transmitter 13 is capable of generating a 10 nanosecond pulse with rise times of 0.5 to 1 ns. PRF generator provides a pulse T(o) to modulator 12. Modulator is connected to transmitter 13. The pulse from transmitter goes by way of duplexer to one of four antennas 1, 2, 3 and 4 for transmission depending on the position of diode switches 5, 6 and 7. Diode switches 5, 6 and 7 are controlled by the outputs of gates 8 and 9, which are gated by flip-flop 10 and pass a pre T(o) pulse provided by PRF generator 11. The pre T(o) pulse occurs approximately 0.1 $\mu$sec before the T(o) pulse. This allowance for switching time will cause the useful PRF to be lower than the maximum value obtained for unambiguous range measurement but it is not significant.

Figure 2:
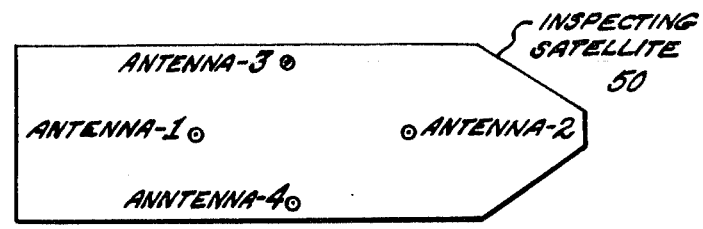
FIG. 2 shows the positioning on the inspecting satellite of two pair of antennas associated with the radar system of FIG. 1.
Figure 3:
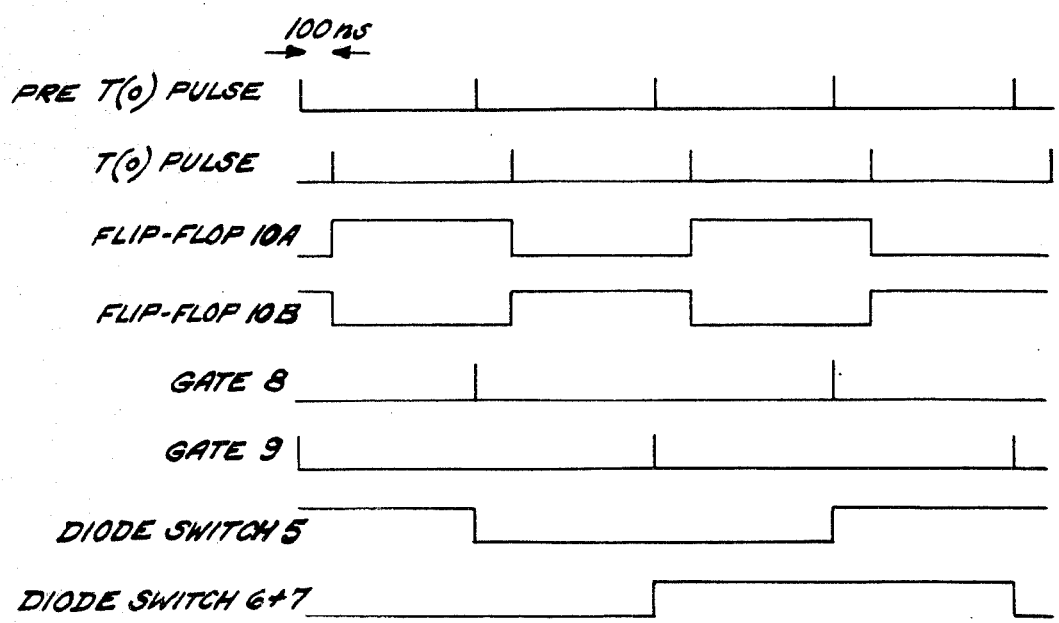
FIG. 3 illustrates a time representation of a gating logic associated with the radar system of FIG. 1.

A time representation of gates 8 and 9 logic is shown in FIG. 2. A T(o) pulse from PRF generator 11 triggers flip-flop 10, the condition of which allows passage of the following pre T(o) pulse through either gate 8 or gate 9. The logic will switch every alternate two transmissions. In this manner transmission toward the satellite being inspected will be through antennas 1 and 2 successively and then antennas 3 and 4 successively. Monitor 28 determines the state of switch 5 which in turn determines which pair of antennas is being used and thus which axis is referenced. Monitor 28 may be an oscilloscope. By allowing a 100 ns switching time, practical diode switches for handling signals of 10 kw peak may be used.

The transmitter pulse is also fed to detector 15 and then used to trigger flip-flop 16. Flip-flop 16 feeds gate 18 which also receives pulses from clock 17. This allows passage of 500 mc clock pulses into conventional up-down counter 19.

The received pulse returned from the satellite being inspected follows the same paths as the transmitted pulse as far as antennas 1-4 and diode switches 5-7 are concerned, but in the opposite direction. The received pulse then goes by way of duplexer 14 to diode switch 20. Diode switch 20 also receives a pre T(o) pulse from PRF generator 11. The received pulse from diode switch 20 is fed to mixer 21. Mixer 21 is also connected to local oscillator 33. The received pulse is thus superheterodyned to an intermediate frequency. It is then fed through amplifier 22 and detector 23. The detected pulse resets flip-flop 16, thereby preventing the entrance of any further pulses into up-down counter 19. The output of the reset side of flip-flop 16 is passed through differentiator 24 and delay 25 and used to trigger flip-flop 26, which supplies the "Add" and "Subtract" commands to up-down counter 19 in such manner that the commands alternate at the PRF and the command change occurs just after the received pulse.

In the event that a pulse is not received, the pre T(o) pulse will reset flip-flop 26 and the count for that particular pair of transmissions is erroneous and would have to be rejected by the conventional attitude control section 27.

By monitoring the position of diode switch 20, it is known which pair of antennas is being used. The output of gate 8 is also used as a "Read" pulse for gates 29–32 to gate the counter information into the attitude control section. This count will actually be the difference between the range measurements of either antennas 1 and 2, or 3 and 4. The state of the most significant digit will determine whether it is negative or positive and thus provide a sense. The output gate 1 is delayed slightly by delay 34 and used to reset up-down counter 19 to all "o's" during the 100 ns switching time.

Diode switch 20 was added to give more isolation between the transmitter and receiver crystals associated with duplexer 14. This switch must be capable of handling powers which are 20 db down from the transmitted power and thus is a low level device. Switching time is 1 ns. It is switched by the pre T(o) pulse and may also be switched (if desired) by the lagging edge of the transmitted pulse. A signal of this type may be available in modulator 12.

The information content of the system's output will then be range to the nearest point on the target (satellite being inspected) and a measurement between the roll and pitch axes of the inspecting satellite and the closest point on the target. The net result of the entire system will be to cause the inspecting satellite to align its roll and pitch axes parallel to the target's nearest point. Thus various inspectors will be brought to bear on the target and collision should not take place unless planned. It is to be noted that the components of the system are conventional and may be off the shelf units. However, it is the new combination of these conventional components which provide a new result.

Obviously many modifications and valuations of the present invention are possible in the light of the above teachings. It is therefore to be understood that within the scope of the appended claims the invention may be practiced otherwise as described.

What is claimed is:

1. A radar mounted in an inspector satellite for observing a target satellite comprising means for generating pulses of short duration to be directed towards said target satellite to provide return pulses therefrom, a first, second, third and fourth antenna associated with said pulse generating means with said first and second antennas being a first pair and said third and fourth antennas being a second pair, said first pair being located along the roll axes and said second pair along the pitch axes of said inspector satellite, switching means to transmit and receive said generated and said return pulses, respectively, by way of said first and second antenna successively and then by said third and fourth antenna successively, means to measure from said return echoes the difference between the range measurements of said first and second antenna from said target satellite and also the difference between the range measurements of said third and fourth antenna from said target satellite.

2. A radar mounted in an inspector satellite for observing a target satellite as described in claim 1 further including means to monitor said first and second pair of antennas to determine the operative pair.

3. A radar mounted in an inspector satellite for observing a target satellite as described in claim 1 further including means to measure from said return pulses the closest range from said inspector satellite to said target satellite.

* * * * *